(12) United States Patent
Ao et al.

(10) Patent No.: US 7,414,967 B2
(45) Date of Patent: Aug. 19, 2008

(54) METHOD FOR ROUTE DISTRIBUTION IN MULTI-SERVICE OPTIMIZATION OF SDH TRANSMISSION NETWORK

(75) Inventors: Qi Ao, Shenzhen (CN); Liang Liu, Shenzhen (CN)

(73) Assignee: Huawei Technologies Co., Ltd. (CN)

( * ) Notice: Subject to any disclaimer, the term of this patent is extended or adjusted under 35 U.S.C. 154(b) by 548 days.

(21) Appl. No.: 11/082,928

(22) Filed: Mar. 17, 2005

(65) Prior Publication Data

US 2005/0157651 A1 Jul. 21, 2005

Related U.S. Application Data

(63) Continuation of application No. PCT/CN03/00514, filed on Jun. 30, 2003.

(30) Foreign Application Priority Data

Sep. 17, 2002 (CN) .............................. 02 1 30930

(51) Int. Cl.
*H04L 29/04* (2006.01)

(52) U.S. Cl. .................... 370/229; 370/235; 370/395.1; 370/400; 370/477; 709/226; 709/241

(58) Field of Classification Search ................ 370/229, 370/235, 395.1, 400, 477; 709/226, 241
See application file for complete search history.

(56) References Cited

U.S. PATENT DOCUMENTS

| 5,596,719 | A | * | 1/1997 | Ramakrishnan et al. ..... 709/241 |
| 5,764,740 | A | | 6/1998 | Holender et al. |
| 5,793,765 | A | * | 8/1998 | Boer et al. .................... 370/400 |
| 5,867,502 | A | * | 2/1999 | Chang ......................... 370/477 |
| 6,094,417 | A | * | 7/2000 | Hansen et al. ............... 370/222 |
| 6,304,639 | B1 | | 10/2001 | Malomsoky et al. |
| 6,363,334 | B1 | * | 3/2002 | Andrews et al. .............. 703/13 |
| 6,377,542 | B1 | | 4/2002 | Asprey |
| 6,400,687 | B1 | * | 6/2002 | Davison et al. ............. 370/236 |
| 6,728,205 | B1 | * | 4/2004 | Finn et al. .................... 370/217 |
| 7,133,410 | B2 | * | 11/2006 | Chow et al. .................. 370/404 |

(Continued)

FOREIGN PATENT DOCUMENTS

EP 0496061 A2 7/1992

OTHER PUBLICATIONS

Coltro C; "Evolution of Transport Network Architectures"; Electrical Communication; Alcatel; Brussels, BE; Jan. 1997; pp. 10-18; XP000685828; ISSN: 0013-4252.

*Primary Examiner*—Huy D. Vu
*Assistant Examiner*—Luat Phung

(57) ABSTRACT

A method of route distribution for implementing multi-service optimization in Synchronous Digital Hierarchy Transmit Network comprises the following steps: A. dividing the SDH transmit network into subnets in term of rings to form a plurality of ring subnets, calculating initial routes of all services demand in the SDH transmit network; B. judging whether there are link resource overload between subnets and inside subnets respectively, if yes, recalculating the route; C. judging whether the load balance index is satisfied by ring subnet, if yes, performing route adjustment; D. after dividing the subnets into edge subnets and core subnets, judging whether the aggregative indicator of each link in the core subnets satisfies convergence condition, if no, checking whether the route calculation times exceeds the threshold, if yes, ending; otherwise, recalculating the corresponding routes.

10 Claims, 2 Drawing Sheets

U.S. PATENT DOCUMENTS

| | | | |
|---|---|---|---|
| 2002/0181470 A1* | 12/2002 | Agnevik et al. | 370/395.21 |
| 2003/0046390 A1* | 3/2003 | Ball et al. | 709/224 |
| 2004/0228331 A1* | 11/2004 | Hansen et al. | 370/352 |
| 2005/0113098 A1* | 5/2005 | Cankaya et al. | 455/446 |
| 2007/0076636 A1* | 4/2007 | Chow et al. | 370/258 |

* cited by examiner

METHOD FOR ROUTE DISTRIBUTION IN MULTI-SERVICE OPTIMIZATION OF SDH TRANSMISSION NETWORK

CROSS-REFERENCE TO RELATED APPLICATIONS

This application is a continuation of international application no. PCT/CN2003/000514 filed Jun. 30, 2003. This application claims the benefit of Chinese application no. 02130930.2 filed Sep. 17, 2002. The disclosures of the above applications are incorporated herein by reference.

FIELD OF THE INVENTION

The present invention relates to multi-service optimization in the network, especially to a method of route distribution for implementing multi-service optimization in Synchronous Digital Hierarchy Transmit Network.

BACKGROUND OF THE INVENTION

The route distribution problem of multi-service optimization in Synchronous Digital Hierarchy (SDH) Transmit Network can be qualitatively described as: in case of network topology, i.e. structure of nodes and links, and service matrix table are provided, it is required that resource of services carried by each link do not exceed the total amount of the network resource, the network resource is occupied to be the least, and network load is balanced, while distributing route for each service. Up to the present, there is no method to solve this problem. However, the most approximate applied scheme is the route distribution method in a Dense Wavelength Division Multiplexing (DWDM) optical network. In this scheme, in order to implement route distribution, heuristic algorithm is often adopted. The principle of heuristic algorithm is: in term of a certain routing strategy, such as shortest route method, calculating the initial solution of service route; then according to whole network resource such as utilized state of wavelength, recalculating the route of a partial services until the service indicator reaches expectation value, or until the calculated result reaches convergence, or until the calculation is repeated for certain times, then obtaining an acceptable solution.

In addition, genetic algorithm or neural network algorithm are adopted in a DWDM network sometimes for routing solution. However, a DWDM network belongs to general Mesh Network, which is a grid network with simple structure and only has interconnection between nodes rather than such structure as rings. Therefore, the heuristic algorithm applied in DWDM network based on such Mesh Network only considers simple connection between nodes, without considers specific network topology feature such as cross connection etc. Therefore, there is great uncertainty of the heuristic algorithm for network multi-service optimization effect. Furthermore, the genetic algorithm and the neural network algorithm are only applicable under the condition of small-scale network and simple constraint. With the network scale growing, especially when number of network nodes exceeds 50, these methods not only need a pretty long time for a solution, but also can not satisfy the time efficiency requirement of service network, and can not obtains the optimum solution under most circumstance.

SUMMARY OF THE INVENTION

Therefore, a main object of the present invention is to provide a method a method of route distribution for implementing multi-service optimization in Synchronous Digital Hierarchy Transmit Network. Not only the optimized object is obtained, i.e. the least network resource be occupied and network load be balanced, but also the calculating efficiency of route distribution is increased in large scale network, and the approximate optimum solution is acquired, making multi-service optimization effect more stable and excellent.

To reach the said objective, a method of Route Distribution for implementing multi-service optimization in Synchronous Digital Hierarchy (SDH) transmit network is provided in the present invention. The keys of this method comprise the following steps:

A. dividing the SDH transmit network into subnets in terms of rings to form a plurality of ring subnets, calculating initial routes of all services demand in the SDH transmit network;

B. judging whether the resource of links between two ring subnets is overloaded, respectively, if there exists a link with resource overloaded, recalculating the routes in terms of all services passing through the link; otherwise, entering step C;

C. judging whether resource of links within each ring subnet is overloaded, respectively, if there exists a link with resource overloaded, adjusting the routes of services within the corresponding ring subnet, returning to step B, otherwise, entering step D;

D. judging whether load of each ring subnet meet the load balance index of the ring subnet, respectively, if there exists a ring subnet whose load does not meet the index, adjusting the routes of services within the ring subnet, returning to step C, otherwise, entering step E;

E. dividing the ring subnets in the SDH transmit network into edge subnets and core subnets, judging whether the aggregative indicator of each link in the core subnets satisfies the preset convergence condition of the subnet, if yes, ending; otherwise, checking if times of routes calculation reaches a preset threshold, if yes, ending, otherwise, recalculating the routes of all services passing through the link.

Said step of judging in step E comprising:

E1. calculating the sum of current link resource occupation ratio of the core subnet multiplied by corresponding relevant weighing coefficient and current integral load balance index of the core subnet multiplied by corresponding relevant weighing coefficient, obtaining the aggregative indicator;

E2. judging whether the calculated aggregative indicator is less than pre-calculated optimum objective, if yes, convergence condition is satisfied, otherwise not satisfied.

The method further comprises: pre-calculating said optimum objective for each core subnet according to the sum of initial link resource occupation ratio of the core subnet multiplied by corresponding relevant weighing coefficient and the integral load balance index of the core subnet multiplied by corresponding relevant weighing coefficient.

The method comprises: setting the variance of link resource occupation ratio of the whole network as said integral load balance index.

Said initial routes of all service demands in step A is calculated according to shortest route algorithm respectively.

Said step of recalculating route in step B and E is recalculating the routes of all service on overloaded links.

Said step of adjusting routing in step C comprising: switching routes of all the service in the overloaded ring subnet between the two different directions of the overloaded ring.

Before step of judging in step E further comprising: judging whether there exists a core subnet in the whole network, if no, ending; otherwise, judging whether the general load balance index of the core subnets is satisfied, if yes, ending; otherwise, going on.

Step E further comprising: defining a ring subnet which is on the edge of the network and has only one link connecting with other subnets as an edge subnet.

Said load balance index in step D is variance of link resource occupation ratio of a ring subnet.

It can be seen from the above-mentioned technical scheme, the key of the present invention is: according the feature of SDH transmit network being constitutive of rings, subnet division is introduced, namely dividing load balance adjust of whole network into internal adjust and integral adjust in term of each ring subnet. Thus the adjustment in ring subnet is simpler and more efficient. Furthermore, by analyzing the factors affecting load balance, those edge subnets unable to be balanced are separated, thus the efficiency and pertinence of integral balance are greatly increased.

Therefore, the method of Route Distribution for implementing multi-service optimization in Synchronous Digital Hierarchy Transmit Network provided by the present invention bears the following features and advantages:

(1) in the present invention, by distributive solving and network division, load balance adjust of whole network is divided into internal adjust and integral adjust in term of each ring subnet, and those edge subnets unable to be balanced are separated, thus significantly increasing calculation efficiency of route distribution in condition of large scale network. Furthermore, an approximate optimum solution can be quickly given, reaching the objective of least occupied network resource and optimum network load balance, thus resulting in excellent and stable multi-service optimization.

(2) By applying the present invention in medium-scale and small-scale network, the optimum solution can be given in 10 seconds, after testing the network, so that the present invention can be well applied in engineering project.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

The present invention now will be described in detail with reference to the accompanying drawings.

In the present invention, based on a general heuristic algorithm, a pertinent solution of route distribution in multi-service optimization is put forward through deeply analyzing SDH network topology morphology. The optimum objective of this method is to occupy the least network resource and balance the network load. Let R indicate link resource occupation ratio of a network, s indicate a load balance index which is remarked by the variance of all link resource occupation ratios in the network, the optimum objective can be expressed as Min(aR+bs), where a and b are weighing coefficients and can be determined by empirical data from practical testing.

SDH transmit network is mainly composed of various rings, such as a Multiplex Section Protection (MSP) ring, a Path Protection (PP) ring and a Dual Node Interconnection (DNI) ring etc. The MSP ring belongs to a path protection ring and fulfils protection switching through cooperation of bit-orientation protocols defined for bytes, working in either single direction or two-direction, being either dual-fiber or quad-fiber, the specific network types of the MSP ring including: a dual-fiber single direction multiplexing section protection ring, a dual-fiber two-direction multiplexing section protection ring and a quad-fiber two-direction multiplexing section protection ring; the PP ring is a special case of subnet connection protection rings which provide protection switching function by connection function, usually just working in a single direction dual-fiber mode, namely the dual-fiber single direction path protection ring; the DNI ring comprises crossover nodes of two subnets and the service configuration of the crossover nodes should be performed according to different assemblages of a practical network.

Figure 1:
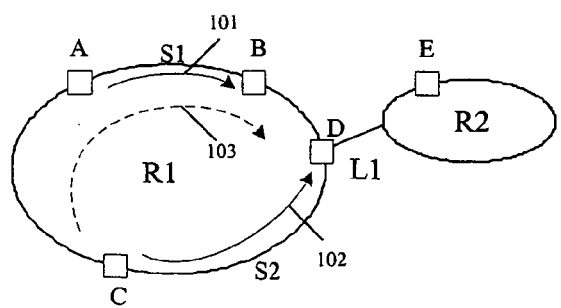
FIG. 1 is a diagram of route adjustment.

According to the features of the above-mentioned different ring networks, it is implemented in the present invention that SDH transmit network be divided into various subnets according to rings; afterwards, the routes are adjusted in accordance with the following principles:

1) As to those route only passing through one subnet, there is no need to perform route recalculation. As is shown in FIG. 1, the route of service S1 is from node A in ring subnet R1 to node B, i.e. the route of S1 is curve 101. Since node A and B both belong to the same ring subnet R1, there is no need to re-adjust routes of this service and the route of S1 remains curve 101. The advantage of introducing principle 1) is to avoid large-scale and low-efficiency routing recalculation.

2) As to an end-to-end service, dividing routes of the service in terms of ring subnets, the part of a route within one of the ring subnets can be switched between two different directions of the ring without affecting other parts of the route. As is shown in FIG. 1, the route of S2 is from node C to node D in ring subnet R1, passing through link L1 and arriving at node E in ring subnet R2, namely the route of S2 is curve 102 plus link L1. If service S2 was overloaded in the route from node C to node D, the route of S2 in ring subnet R1 is adjusted from curve 102 to curve 103, i.e. from node C to node D while passing node A and B. It can be seen from FIG. 1 that the adjustment will not affect routings in other parts of the service. The advantage of introducing principle 2 is to make routing adjustment match the characteristic of SDH network topology. Through separating the load balance adjustment of the whole transmit network, making a partial simple adjustment with only two directions for choice, the partial load balance is attained, further load balance of the whole transmit network is attained. By this kind of division, the times of routing adjustment of the whole network are reduced, thus calculational efficiency of routing is greatly increased; meanwhile, the blindness of direct routing adjustment is avoided, resulting in a better balance effect.

3) Under the precondition of subnet division, the concepts of edge subnet and core subnet are introduced. The edge subnet is defined as such a partial subnet that is located at the edge of network and has only one link connection with other subnets, core subnet is defined as such the residual subnets other than the edge subnets in a whole network.

Figure 2:
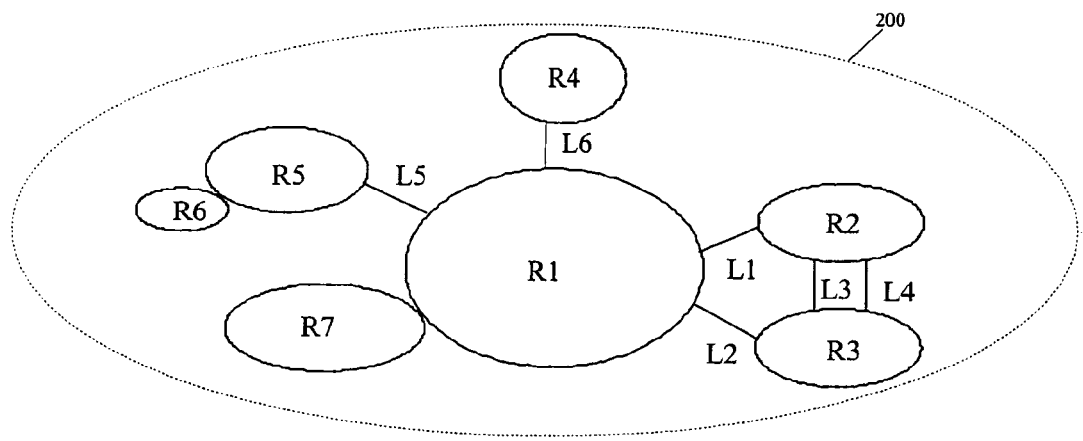
FIG. 2 is a diagram shows the division of edge subnet and core subnet.

FIG. 2 shows the division of edge subnets and core subnets. As for a network topology structure 200 in practice, after being divided into different subnets in terms of rings, the network is further divided into edge subnets and core subnets. As show in FIG. 2, R indicates ring subnets and L links, wherein R4, R5, R6, R7, L5 and L6 constitute edge subnets, while R1, R2, R3, L1, L2, L3 and L4 constitute core subnets. When calculating load balance index of a network, i.e. the variance of all link resource occupation ratios of the network, only the core subnet part is concerned. Because inequality of the service volume between ring R7 and ring R4 will lead to imbalance of service volume in the network, and this imbalance cannot be improved by load balance adjust. The optimum effect will not be satisfactory through recalculating the routing of the service of the edge subnets.

The advantage of principle 3) is to avoid a great deal of ineffective calculation to those networks unable to be balanced.

Figure 3:
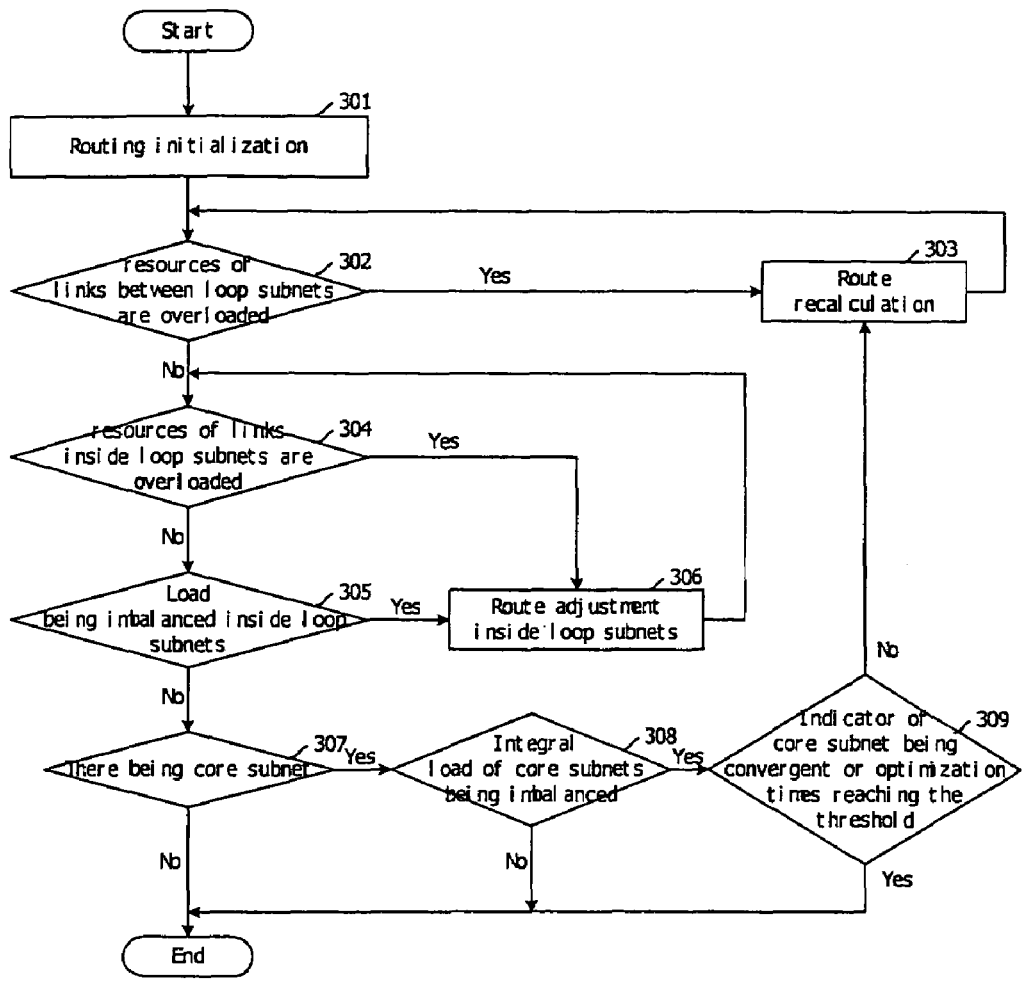
FIG. 3 is the general flow chart for implementing the present invention.

FIG. 3 shows the general flow of the present invention. An illustration is given with reference to FIG. 1 and every specific step in the flow as follows.

Step 301 routing initialization: performing initialization in term of shortest route, i.e. invoking shortest path algorithm, calculating the initial route of each service according to demands of the each service.

Step 302 checking resource of links between ring subnets: checking if the resource of links between ring subnets, such as link L1, L2, L3, L4, L5 and L6, is overloaded, if not, directly turning to step 304 to check link resource inside ring subnets.

Step 303 routing recalculation: if resource of a link between ring subnets such as L1 is overloaded, i.e. resource occupation ratio of this link exceeds a settled standard, recalculating routes in terms of all services passing through this link, and then turning to step 302 to check link resource between ring subnets.

Step 304 checking of link resource inside ring subnets: checking if resource of links inside ring subnets R1, R2, R3, R4, R5, R6 and R7 is overloaded. If yes, directly turning to step 306 to adjust route inside ring subnets; otherwise, turning to step 305.

Step 305 checking of load balance inside ring subnets: checking if the ring subnets R1, R2, R3, R4, R5, R6 and R7 satisfy the load balance index of each subnet respectively. If yes, directly turning to step 307 to judge the existence of core subnet in the whole network; otherwise, turning to step 306. Here, the load balance index of a subnet is the variance of link resource occupation ratio in the ring subnet.

Step 306 route adjustment inside ring subnets: if a ring subnet such as R1 do not satisfy its load balance index, or resource of a link inside a ring subnet is overloaded, then re-adjusting the routes in the two directions of the ring to all services inside the subnet, switching the route between the two different ring directions, consequently achieving load balance of this subnet, then turning to step 304 to check link resource inside ring subnets.

Step 307 judging the existence of core subnet in the whole network, if no core subnet exists, ending this optimization process.

Step 308 checking of load balance in terms of core subnet: if the existence of core subnets such as R1, R2, R3, L1, L2, L3 and L4, is confirmed, checking whether the general load balance index of each core subnet is satisfied, if yes, ending current optimization process; otherwise turning to step 309. The general load balance index is the variance of all link resource occupation ratios in the core subnets.

Step 309 checking of ending condition: if the general load balance index of the core subnets is not satisfied, then checking the convergence state of current aggregative indicator of each core subnet, wherein the aggregative indicator is composed of resource occupation ratio and integral load balance index. Said aggregative indicator is obtained by calculating the sum of link resource occupation ratio of the core subnet R multiplied by its relevant weighing coefficient a and the integral load balance index of the core subnet S multiplied by its relevant weighing coefficient b. If the aggregative indicator meets the convergence condition, i.e. the aggregative indicator is no greater than the optimum objective Min(aR+bS) which is pre-calculated according to network situation and practical testing experience, then ending current optimization process; otherwise, checking the times of routing calculations, if current calculation times exceeds the preset threshold, ending the optimization process, otherwise, turning to step 303, recalculating the routes of all services passing through the link.

The above introduction is just a preferable embodiment of the present invention, not confining the protection scope of the present invention.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of route distribution for implementing multi-service optimization in a Synchronous Digital Hierarchy (SDH) transmit network, comprising:
   A. dividing the SDH transmit network into subnets in terms of rings to form a plurality of ring subnets, calculating initial routes for all services demand in the SDH transmit network;
   B. judging whether resource of links between two ring subnets is overloaded, if there exists a link with resource overloaded, recalculating the routes in terms of all services passing through the link; otherwise, entering step C;
   C. judging whether resource of links within each ring subnet is overloaded, if there exists a link with resource overloaded, adjusting the routes of services within the ring subnet, returning to step B, otherwise, entering step D;
   D. judging whether load of each ring subnet meets a load balance index of the ring subnet, respectively, if there exists a ring subnet whose load does not meet the load balance index, adjusting the routes of services within the ring subnet, returning to step C, otherwise, entering step E;
   E. dividing the ring subnets in the SDH transmit network into edge subnets and core subnets, judging whether an aggregative indicator of each link in the core subnets satisfies a preset convergence condition of the subnet, if yes, ending; otherwise, checking if times of routes calculation performed in step B reaches a preset threshold, if yes, ending, otherwise, recalculating the routes of all services passing through said each link.

2. The method of claim 1, wherein said step of judging in step E comprises:
   E1. calculating the sum of current link resource occupation ratio of the core subnet multiplied by corresponding relevant weighing coefficient and current integral load balance index of the core subnet multiplied by corresponding relevant weighing coefficient, obtaining the aggregative indicator;

E2. judging whether the calculated aggregative indicator is less than pre-calculated optimum objective, if yes, convergence condition is satisfied, otherwise not satisfied.

3. The method of claim 2, further comprising: pre-calculating an optimum objective for each core subnet according to the sum of initial link resource occupation ratio of the core subnet multiplied by corresponding relevant weighing coefficient and the integral load balance index of the core subnet multiplied by corresponding relevant weighing coefficient.

4. The method of claim 3, wherein said integral load balance index is a variance of link resource occupation ratio of the whole network.

5. The method of claim 1, wherein said initial routes of all services demand in step A is calculated according to a shortest route algorithm.

6. The method of claim 1, wherein said step of recalculating route in steps B and E is recalculating the route of all service on overloaded links.

7. The method of claim 1, wherein said step of adjusting route in step C comprises: switching routes of all the service in the overloaded ring subnet between the two different directions of the overloaded ring.

8. The method of claim 1, before step of judging in step E further comprising: judging whether there exists a core subnet in the whole network, if no, ending; otherwise, judging whether a general load balance index of the core subnets is satisfied, if yes, ending; otherwise, going to step E.

9. The method of claim 1, wherein step E further comprises: defining the ring subnet which is on the edge of the network and has only one link connecting with other subnets as an edge subnet.

10. The method of claim 1, wherein said load balance index in step D is variance of link resource occupation ratio of a ring subnet.

* * * * *